United States Patent
Baek et al.

(10) Patent No.: US 10,897,277 B2
(45) Date of Patent: Jan. 19, 2021

(54) METHOD FOR ESTIMATING SELF-INTERFERENCE SIGNAL BASED ON ITERATIVE ESTIMATION AND APPARATUS USING THE SAME

(71) Applicant: Electronics and Telecommunications Research Institute, Daejeon (KR)

(72) Inventors: Myung-Sun Baek, Daejeon (KR); Joon-Young Jung, Daejeon (KR); Heung-Mook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 35 days.

(21) Appl. No.: 16/152,849

(22) Filed: Oct. 5, 2018

(65) Prior Publication Data
US 2019/0181897 A1 Jun. 13, 2019

(30) Foreign Application Priority Data
Dec. 11, 2017 (KR) .................. 10-2017-0169503

(51) Int. Cl.
| | |
|---|---|
| H04L 5/14 | (2006.01) |
| H04B 17/14 | (2015.01) |
| H04B 1/525 | (2015.01) |
| H04B 1/50 | (2006.01) |
| H04B 1/56 | (2006.01) |

(Continued)

(52) U.S. Cl.
CPC ............ *H04B 1/1027* (2013.01); *H04B 1/04* (2013.01); *H04B 1/525* (2013.01); *H04B 17/14* (2015.01); *H04B 17/345* (2015.01); *H04L 5/14* (2013.01); *H04B 1/50* (2013.01); *H04B 1/56* (2013.01); *H04B 2001/0408* (2013.01)

(58) Field of Classification Search
CPC ............. H04B 1/1027; H03H 21/0067; G06T 7/0012; G02B 6/34
See application file for complete search history.

(56) References Cited

U.S. PATENT DOCUMENTS

| | | | |
|---|---|---|---|
| 8,265,561 | B2 | 9/2012 | Nakamura |
| 8,515,277 | B2 | 8/2013 | Tanimura et al. |

(Continued)

FOREIGN PATENT DOCUMENTS

| | | |
|---|---|---|
| JP | 5375519 B2 | 12/2013 |
| JP | 10-2017-0001597 A | 1/2017 |
| KR | 10-2016-0052559 A | 5/2016 |

*Primary Examiner* — Iqbal Zaidi
(74) *Attorney, Agent, or Firm* — NSIP Law

(57) ABSTRACT

Disclosed herein are a method for estimating a self-interference signal based on iterative estimation and an apparatus for the same. The method is configured to transmit two preamble signals from the transmission antenna of one terminal to the reception antenna thereof, to estimate third-order nonlinear distortion, which distorts a self-interference signal, based on a transmission signal and a reception signal for each of the two preamble signals, to update the reception signal by eliminating the third-order nonlinear distortion therefrom, to re-estimate the third-order nonlinear distortion based on the updated reception signal, and to estimate the self-interference signal based on the final third-order nonlinear distortion, which is acquired by repeatedly re-estimating the third-order nonlinear distortion as many times as a preset number of iterations.

12 Claims, 6 Drawing Sheets

(51) Int. Cl.
*H04B 1/10* (2006.01)
*H04B 1/04* (2006.01)
*H04B 17/345* (2015.01)

(56) References Cited

U.S. PATENT DOCUMENTS

| | | | |
|---|---|---|---|
| 8,891,701 B1 * | 11/2014 | Eliaz | H04L 27/2647 |
| | | | 375/346 |
| 9,270,501 B2 | 2/2016 | Oh et al. | |
| 10,050,659 B2 | 8/2018 | Choi et al. | |
| 2016/0191020 A1 * | 6/2016 | Velazquez | H03H 21/0067 |
| | | | 341/118 |
| 2016/0365883 A1 * | 12/2016 | Tu | H04B 1/123 |
| 2016/0380799 A1 | 12/2016 | Chang et al. | |
| 2017/0194992 A1 | 7/2017 | Kim et al. | |

* cited by examiner

METHOD FOR ESTIMATING SELF-INTERFERENCE SIGNAL BASED ON ITERATIVE ESTIMATION AND APPARATUS USING THE SAME

CROSS REFERENCE TO RELATED APPLICATION

This application claims the benefit of Korean Patent Application No. 10-2017-0169503, filed Dec. 11, 2017, which is hereby incorporated by reference in its entirety into this application.

BACKGROUND OF THE INVENTION

1. Technical Field

The present invention relates generally to a method for estimating a self-interference signal in a wireless communication signal, and more particularly to a method and apparatus for estimating a self-interference signal based on iterative estimation in which a self-interference signal is effectively estimated using third-order nonlinear distortion that is generated due to a channel and the use of a high-power amplifier.

2. Description of the Related Art

As shown in FIG. 1, when a base station 100 communicates with terminals 110 and 120 using an uplink and a downlink, a general communication system allocates different channels, acquired by dividing a frequency band, or different time slots to the uplink and the downlink in order to prevent interference between an uplink signal and a downlink signal. Here, a duplex communication method in which different channels are used for an uplink and a downlink is called Frequency-Division Duplex (FDD) and a duplex communication method in which different time slots are assigned to an uplink and a downlink is called Time-Division Duplex (TDD). However, as shown in FIG. 2 and FIG. 3, FDD or TDD is configured to transmit an uplink signal 210 or 310 and a downlink signal 220 or 320 on different channels or at different times, thereby reducing spectral efficiency.

In order to overcome this disadvantage, a full-duplex method in which transmission and reception are simultaneously performed on the same frequency band has been proposed.

In a full-duplex method, a transceiver receives a signal at the time of transmitting its own signal, rather than dividing a frequency band or a time domain for transmission and reception, whereby spectral efficiency may be effectively improved. However, when signals are simultaneously transmitted and received, a signal transmitted from a transceiver may act as interference on a received signal. Therefore, in order to enable a receiver within a transceiver to effectively detect a signal transmitted from a transmitter within the same transceiver, a process of effectively modeling and eliminating the self-interference signal is required in a full-duplex method.

Documents of Related Art (Patent Document 1) Korean Patent Application Publication No. 10-2017-0001597, published on Jan. 4, 2017 and titled "Method and apparatus for estimating input information of finite impulse response (FIR) filter in in-band full duplex transceiver".

SUMMARY OF THE INVENTION

An object of the present invention is to provide a method for effectively estimating and eliminating a self-interference signal in a full-duplex environment.

Another object of the present invention is to provide a method for effectively estimating a distortion factor that distorts a self-interference signal.

In order to accomplish the above objects, a method for estimating a self-interference signal according to the present invention includes transmitting two preamble signals from a transmission antenna of one terminal to a reception antenna thereof; estimating third-order nonlinear distortion, which distorts a self-interference signal, based on transmission signals and reception signals for the two preamble signals; updating the reception signal by eliminating the third-order nonlinear distortion therefrom and re-estimating the third-order nonlinear distortion based on the updated reception signal; and estimating the self-interference signal based on final third-order nonlinear distortion, which is repeatedly re-estimated as many times as a preset number of iterations.

Here, estimating the third-order nonlinear distortion may include estimating a channel coefficient for a channel between the transmission antenna and the reception antenna; estimating nonlinear distortion gain, generated by a High-Power Amplifier (HPA) for amplifying the transmission signal, based on the channel coefficient; and estimating a nonlinear factor, an order of which corresponds to a third-order Intercept Point (IP3), in a signal that is input to the HPA based on the channel coefficient and the nonlinear distortion gain.

Here, estimating the third-order nonlinear distortion may be configured to perform a convolution or multiplication operation for at least one of the channel coefficient, the nonlinear distortion gain, and the nonlinear factor.

Here, re-estimating the third-order nonlinear distortion may include calculating an updated reception signal by eliminating the third-order nonlinear distortion from a first reception signal for a first preamble signal, among the two preamble signals; and re-estimating the channel coefficient and the nonlinear distortion gain using the updated reception signal and a first transmission signal for the first preamble signal.

Here, estimating the self-interference signal may be configured to detect the final third-order nonlinear distortion based on an updated channel coefficient and updated nonlinear distortion gain, which are repeatedly re-estimated as many times as the preset number of iterations, and to estimate the self-interference signal in consideration of the first reception signal, the first transmission signal, and the final third-order nonlinear distortion.

Here, channel coefficients applied to the respective reception signals for the two preamble signals may be identical to each other.

Here, while the two preamble signals are being transmitted, signals, other than the two preamble signals, may not be transmitted to the reception antenna.

Also, an apparatus for estimating a self-interference signal according to an embodiment of the present invention includes a processor for estimating third-order nonlinear distortion, which distorts a self-interference signal, based on transmission signals and reception signals for two preamble signals that are transmitted from a transmission antenna of one terminal to a reception antenna thereof, updating the reception signal by eliminating the third-order nonlinear distortion therefrom, re-estimating the third-order nonlinear distortion based on the updated reception signal, and estimating the self-interference signal based on final third-order nonlinear distortion, which is repeatedly re-estimated as many times as a preset number of iterations; and memory for storing the transmission signals, the reception signals, and at least one of the intermediate third-order nonlinear distortion and the final third-order nonlinear distortion.

Here, the processor may estimate a channel coefficient for a channel between the transmission antenna and the reception antenna, estimate nonlinear distortion gain, generated by a High-Power Amplifier (HPA) for amplifying the transmission signal, based on the channel coefficient, and estimate a nonlinear factor, an order of which corresponds to a third-order Intercept Point (IP3), in a signal that is input to the HPA based on the channel coefficient and the nonlinear distortion gain.

Here, the processor may perform a convolution or multiplication operation for at least one of the channel coefficient, the nonlinear distortion gain, and the nonlinear factor.

Here, the processor may calculate an updated reception signal by eliminating the third-order nonlinear distortion from a first reception signal for a first preamble signal, among the two preamble signals, and may re-estimate the channel coefficient and the nonlinear distortion gain using the updated reception signal and a first transmission signal for the first preamble signal.

Here, the processor may detect the final third-order nonlinear distortion based on an updated channel coefficient and updated nonlinear distortion gain, which are repeatedly re-estimated as many times as the preset number of iterations, and may estimate the self-interference signal in consideration of the first reception signal, the first transmission signal, and the final third-order nonlinear distortion.

Here, channel coefficients applied to the reception signals for the two preamble signals may be identical to each other.

Here, while the two preamble signals are being transmitted, signals, other than the two preamble signals, may not be transmitted to the reception antenna.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
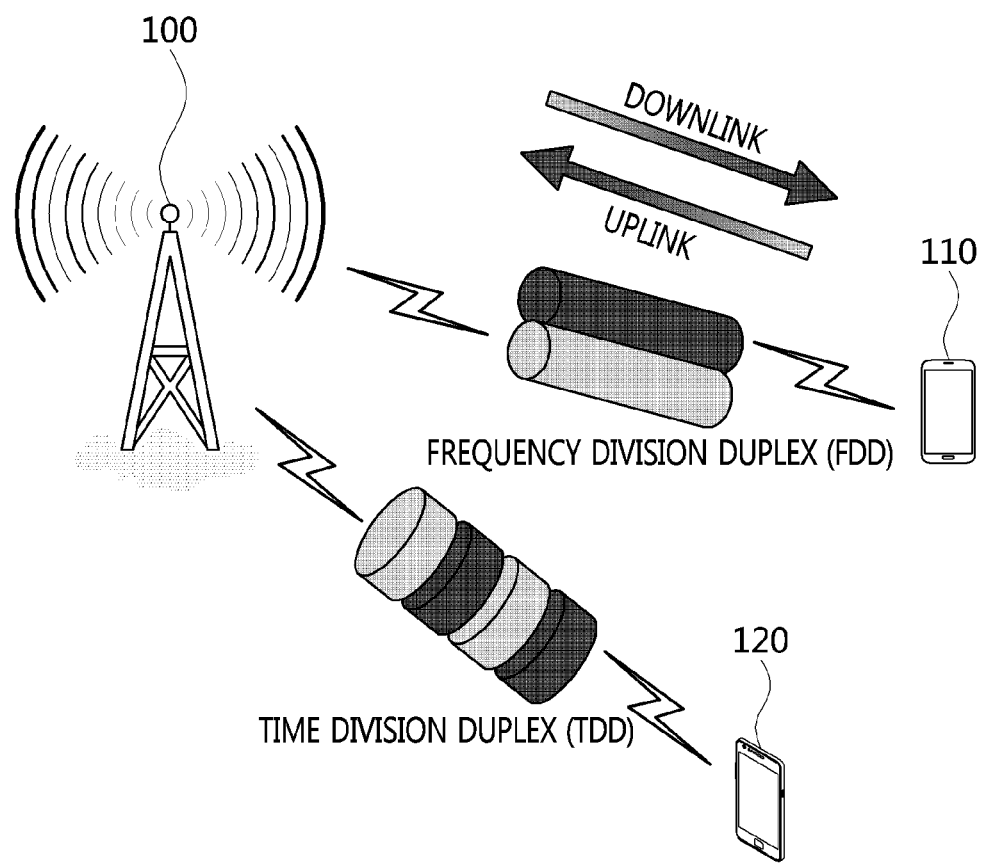
FIG. 1 is a view that shows an example of an environment in which signals are transmitted and received between a base station and terminals.
Figure 2:
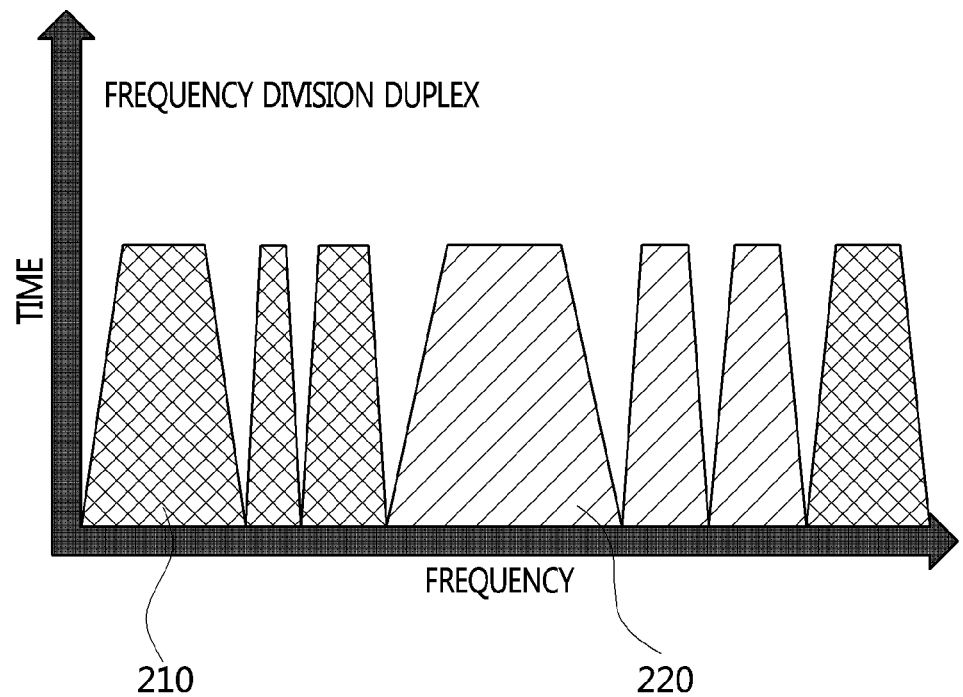
FIG. 2 is a view that shows an example of communication based on Frequency-Division Duplex (FDD)
Figure 3:
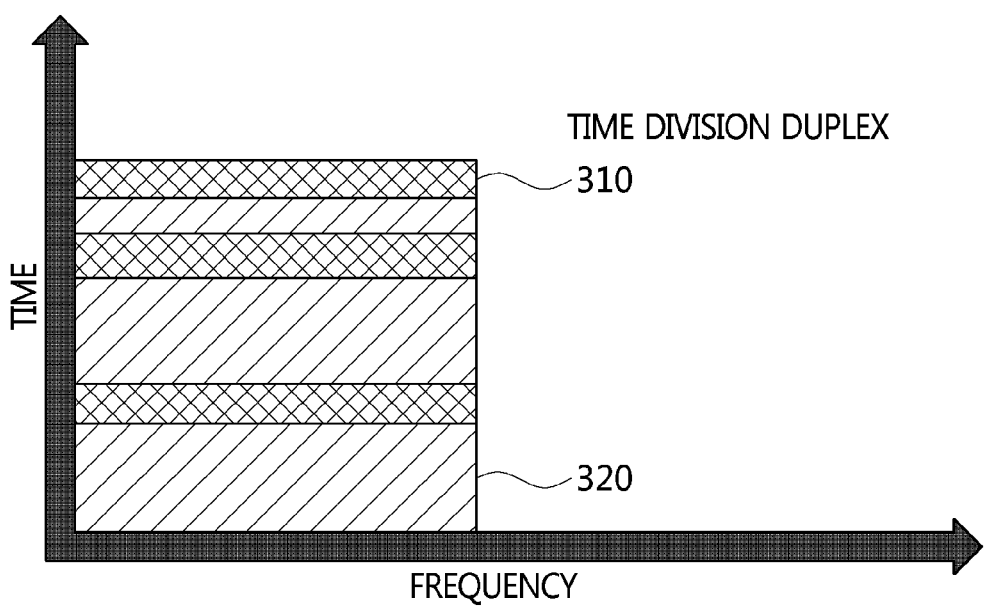
FIG. 3 is a view that shows an example of communication based on Time-Division Duplex (TDD)

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 4:
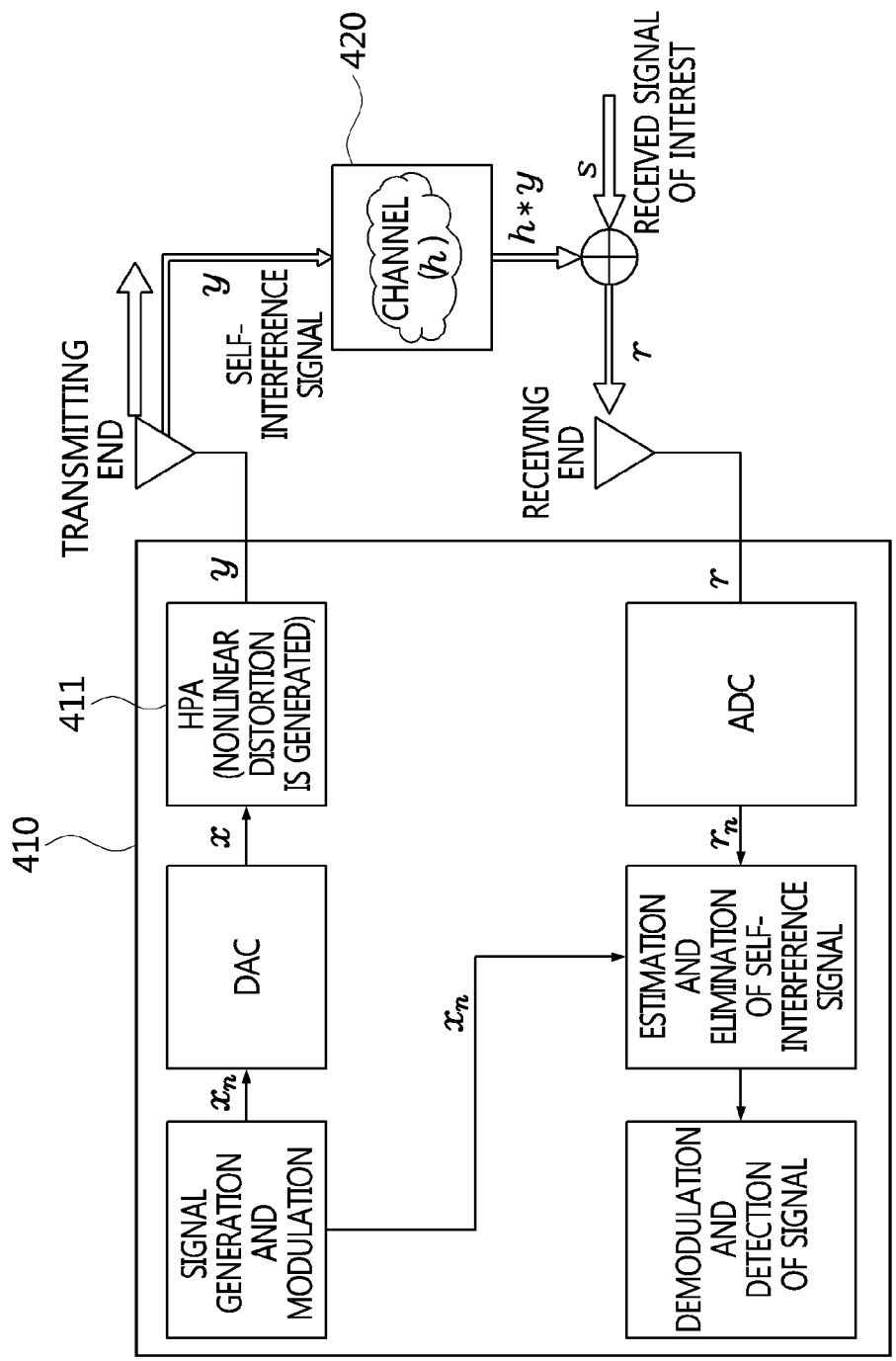
FIG. 4 is a view that shows an example of a full-duplex transceiver system.

FIG. 4 is a view that shows an example of a transceiver system using a full-duplex terminal.

Referring to FIG. 4, the full-duplex terminal 410, in which transmission and reception are simultaneously performed, may receive a downlink signal transmitted from a base station or other terminals at the time of transmitting an uplink signal to the base station or other terminals.

Here, when a transmission frequency, at which the terminal 410 transmits a signal, is the same as a reception frequency, at which the terminal 410 receives a signal, the two signals are combined and received by the reception antenna of the terminal 410; that is, self-interference occurs. The self-interference signal may be received by the reception antenna of the terminal 410 after being distorted depending on the procedure by which the signal to be transmitted and the received signal are processed.

Here, the main factor that distorts the self-interference signal may be nonlinear distortion generated by a High-Power Amplifier (HPA) 411 and a channel coefficient for the channel 420 between the transmission antenna and the reception antenna.

Here, the nonlinear distortion generated by the HPA 411 is related to nonlinearity between the input and output of the HPA 411. Such nonlinear distortion may generate a nonlinear factor, and this may be represented using the following Equation (1):

$$y = \sum_{m=0}^{M-1} \alpha_{m+1} x^{m+1} \qquad (1)$$

where x denotes a signal input to the HPA 411, y denotes a signal output from the HPA 411, and α denotes the linear gain or nonlinear gain of the HPA 411.

Here, because the center frequency generated by an even-order nonlinear factor is a multiple of the center frequency of the signal intended to be transmitted, even-order nonlinear factors have little effect on the in-band signal. Conversely, because the center frequency generated by an odd-order nonlinear factor is the same as or similar to the center frequency of the signal intended to be transmitted, odd-order nonlinear factors affect the in-band signal. Accordingly, only odd-order nonlinear factors are considered, whereby the output of the HPA 411 may be represented using the following Equation (2):

$$y^i = \sum_{m=0}^{M/2} \alpha_{2m+1} x^{2m+1} \qquad (2)$$

Here, the power of higher-order nonlinear factors in Equation (2) may be low enough to be neglected. Meanwhile, the first nonlinear factor, among the odd-order nonlinear factors, is called a third-order intercept point (IP3) and has the greatest effect on nonlinear distortion.

Accordingly, in the method for estimating a self-interference signal according to an embodiment of the present invention, an IP3 is considered when a self-interference signal is estimated. Here, assuming that the gain of the HPA 411 for the first-order term is 1 (that is, $\alpha_1=1$) for the convenience of description and calculation, the output of nonlinear distortion of the HPA 411 may be simply represented, as shown in the following Equation (3):

$$y = x + \alpha_3 \cdot x^3 \quad (3)$$

Here, as shown in FIG. 4, the signal to be transmitted, which is amplified by the HPA 411, may be transmitted by the transmission antenna and pass through the channel 420. Then, the signal may be received by the reception antenna. The received signal is converted into a digital signal by an Analog-to-Digital Converter (ADC), and may be represented as shown in the following Equation (4):

$$r_n = s_n + \underbrace{(y_n * h_n)}_{\text{Self-Interference}} + w_n \quad (4)$$

In Equation (4), n denotes a sample index, and $s_n$ and $w_n$ denote the signal of interest that the reception module wants to receive and Additive White Gaussian Noise (AWGN), respectively. Also, $y_n$ and $h_n$, which are the variables in the parentheses in Equation (4), may be variables that constitute the self-interference signal. Here, among the variables in the parentheses, y is the signal transmitted by the transmission antenna, shown in Equation (3), and h indicates a channel coefficient for the channel between the transmission antenna and the reception antenna. Also, '*' indicates a convolution operation. That is, a new signal may be generated by combining the transmitted signal and the channel coefficient.

Here, assuming that the self-interference signal is d, the self-interference signal may be represented as shown in the following Equation (5):

$$d_n = x_n * h_n + \alpha_3 \cdot x_n^3 * h_n \quad (5)$$

In the process of estimating the self-interference signal $d_n$ and eliminating the same from the signal received by the reception antenna of the terminal 410, the signal of interest $s_n$ may become an obstacle to estimation. Accordingly, the present invention assumes a specific time interval for estimating a self-interference signal during which the transmission module of the terminal 410 transmits its signal, but a counterpart terminal and other terminals transmit no signal to the terminal 410. Here, the signal that is received while only the terminal 410 transmits its signal may be represented as shown in the following Equation (6):

$$r_n = d_n + w_n = x_n * h_n + \alpha_3 \cdot x_n^3 * h_n + w_n \quad (6)$$

In Equation (6), because $x_n$ corresponds to the signal transmitted by the terminal 410 and $r_n$ corresponds to the signal received by the terminal 410, they are known values when the self-interference signal is estimated.

However, the channel coefficient $h_n$, which distorts $x_n$, and $\alpha_3$, which is nonlinear distortion gain, are values that are required to be estimated in order to estimate the self-interference signal.

Accordingly, the present invention intends to propose a method for estimating a channel coefficient $h_n$ and nonlinear distortion gain $\alpha_3$, thereby effectively estimating a self-interference signal.

Figure 5:
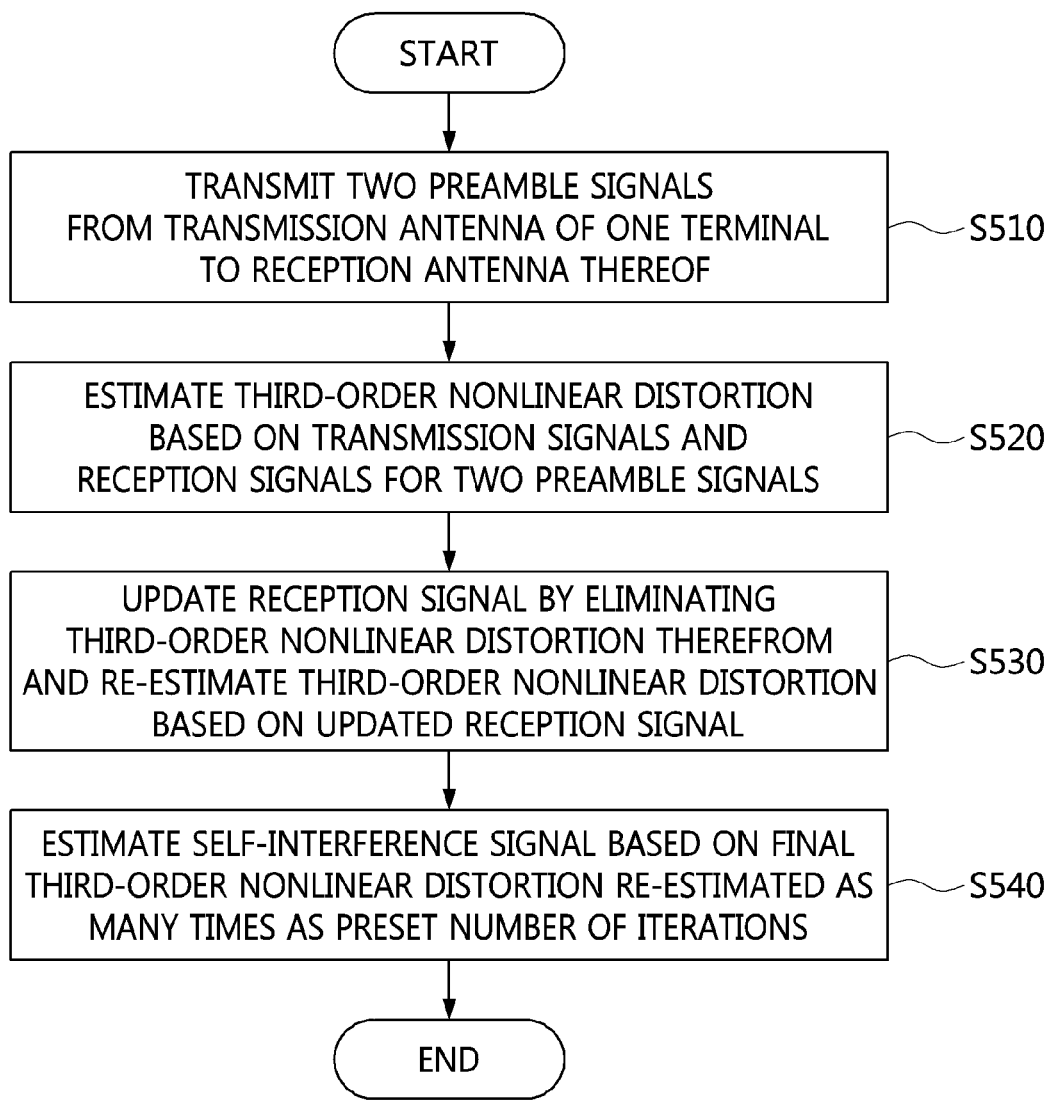
FIG. 5 is a flowchart that shows a method for estimating a self-interference signal according to an embodiment of the present invention.

FIG. 5 is a flowchart that shows a method for estimating a self-interference signal according to an embodiment of the present invention.

Referring to FIG. 5, in the method for estimating a self-interference signal according to an embodiment of the present invention, two preamble signals are transmitted from the transmission antenna of one terminal to the reception antenna thereof at step S510.

For example, two preamble signals may be generated using the signal generation and modulation module of the terminal 410 illustrated in FIG. 4, and the two preamble signals may be transmitted to the reception antenna via the High-Power Amplifier (HPA) 411, the transmission antenna, and the channel 420. Here, assuming that the two preamble signals generated by the terminal 410, that is, the transmission signals, are $x_1$ and $x_2$, two reception signals $r_1$ and $r_2$, corresponding to the two transmission signals, may be represented as shown in the following Equation (7):

$$r_1 = x_1 * h_1 + \alpha_3 \cdot x_1^3 * h_1 + w_1,$$
$$r_2 = x_2 * h_2 + \alpha_3 \cdot x_2^3 * h_2 + w_1 \quad (7)$$

Here, $h_1$ and $h_2$ are the channel coefficients for the channel 420 between the transmission antenna and the reception antenna illustrated in FIG. 4, and $\alpha_3$ is nonlinear distortion gain by the HPA 411.

Here, the channel coefficients $h_1$ and $h_2$ may be the same as each other in a fixed communication environment or in a communication environment in which the terminal hardly moves.

Also, because the channel coefficients correspond to the channel between the transmission antenna and the reception antenna of the same terminal, a Line of Sight (LoS) may be secured, and most energy may be assigned to a main path.

Accordingly, in the present invention, the channel coefficients $h_1$ and $h_2$ are assumed to be channel coefficients for a channel having a single path, and may thus be represented as h.

Here, the channel coefficient h is applied to Equation (7), and a convolution operation (*) is changed to multiplication (·), whereby Equation (8) may be acquired as the following:

$$r_1 = x_1 \cdot h + \alpha_3 \cdot x_1^3 \cdot h + w_1,$$
$$r_2 = x_2 \cdot h + \alpha_3 \cdot x_2^3 \cdot h + w_2 \quad (8)$$

Here, while the two preamble signals are being transmitted, signals other than the two preamble signals may not be received by the reception antenna. That is, a signal transmitted from a counterpart terminal or other terminals may become an obstacle to estimation of a self-interference signal. Accordingly, the present invention assumes a specific time interval for estimating a self-interference signal during which a terminal transmits and receives only its own signals, and a counterpart terminal and other terminals transmit no signal thereto.

Also, in the method for estimating a self-interference signal according to an embodiment of the present invention, third-order nonlinear distortion, which distorts the self-interference signal, is estimated at step S520 based on the transmission signal and the reception signal for each of the two preamble signals.

Here, the channel coefficient for the channel between the transmission antenna and the reception antenna is estimated, nonlinear distortion gain by the HPA, which amplifies the signal to be transmitted, is estimated based on the channel coefficient, and a nonlinear factor, the order of which corresponds to the third-order Intercept Point (IP3), in the signal that is input to the HPA may be estimated based on the channel coefficient and the nonlinear distortion gain.

Here, because the nonlinear factor corresponding to the IP3 has been described with reference to FIG. 4, a description thereof will be omitted.

For example, using the reception signal $r_1$ in Equation (8), the channel coefficient h may be changed to a variable for the nonlinear distortion gain $\alpha_3$ through the following Equations (9) and (10):

$$\frac{r_1}{x_1} = \tilde{r}_1 = h + \alpha_3 \cdot x_1^2 \cdot h + \frac{w_1}{x_1} \quad (9)$$

$$\hat{h} = \frac{\tilde{r}_1}{1 + \alpha_3 x_1^2} + \dot{w} \quad (10)$$

Here, the nonlinear distortion gain $\alpha_3$ is calculated by putting $\hat{h}$ into the equation for the reception signal $r_2$, and this may be represented as shown in the following Equation (11):

$$\hat{\alpha}_3 = \frac{\tilde{r}_2 - \tilde{r}_1}{\tilde{r}_1 x_2^2 - \tilde{r}_2 x_1^2} + \ddot{w} \quad (11)$$

Here, Equation (10) is applied to Equation (9), whereby the channel coefficient h may be estimated.

Then, the estimated nonlinear distortion gain $\alpha_3$ and the estimated channel coefficient h are put into Equation (8) or Equation (9), whereby the nonlinear factor $x^3$, the order of which corresponds to the IP3, in the signal that is input to the HPA may be estimated.

Here, a convolution or multiplication operation is performed for at least one of the channel coefficient, the nonlinear distortion gain, and the nonlinear factor, whereby the third-order nonlinear distortion may be estimated. For example, the estimated third-order nonlinear distortion may correspond to '$\alpha_3 \cdot x^3 \cdot h$' or '$\alpha_3 \cdot x^3 * h$'.

Also, in the method for estimating a self-interference signal according to an embodiment of the present invention, the reception signal is updated by eliminating the third-order nonlinear distortion therefrom, and the third-order nonlinear distortion is re-estimated based on the updated reception signal at step S530.

Here, the reason why the third-order nonlinear distortion is re-estimated based on the updated reception signal is to more correctly estimate the third-order nonlinear distortion in consideration of noise generated in the process of estimating the channel coefficient or the nonlinear distortion gain.

For example, when the channel coefficient h and the nonlinear distortion gain $\alpha_3$, which are estimated using Equation (10) and Equation (11), are used, it may be possible to estimate and eliminate the self-interference signal. However, it is impossible to eliminate the noise $\dot{w}$, which is generated when the channel coefficient is estimated in Equation (10), and the noise $\ddot{w}$, which is generated when the nonlinear distortion gain is estimated in Equation (11).

Accordingly, in order to improve the performance of self-interference signal estimation despite the presence of noise, the present invention may perform iterative estimation.

Here, the third-order nonlinear distortion is eliminated from the reception signal for the first preamble signal, among the two preamble signals, whereby the updated reception signal may be calculated.

Then, using the transmission signal for the first preamble signal and the updated reception signal, the channel coefficient and the nonlinear distortion gain may be re-estimated.

For example, referring to Equation (12), third-order nonlinear distortion is generated using the channel coefficient and the nonlinear distortion gain, respectively estimated in Equation (9) and Equation (10), and the third-order nonlinear distortion is eliminated from the reception signal, whereby the updated reception signal may be calculated.

$$\hat{r}_n = r_n - \hat{\alpha}_3 \cdot x_n^3 \cdot \hat{h} \quad (12)$$
$$= x_n \cdot h + \ddot{w}_n$$

Here, in Equation (12), $\ddot{w}_B$ may be a variable acquired by adding Additive White Gaussian Noise (AWGN) and an error value that is generated when the third-order nonlinear distortion is incompletely estimated and eliminated. Here, after the third-order nonlinear distortion is eliminated, as shown in Equation (12), the channel coefficient may be newly estimated, as shown in Equation (13) using the transmission signal $x_n$, which is already known.

$$\tilde{h} = \frac{\hat{r}_n}{x_n} \quad (13)$$

Then, using the newly estimated channel coefficient $\tilde{h}$, the nonlinear distortion gain may be re-estimated as shown in Equation (14):

$$\tilde{\alpha}_3 = \frac{r_n - \tilde{h} \cdot x_n}{\tilde{h} \cdot x_n^3} \quad (14)$$

Through the above-described process, the channel coefficient and the nonlinear distortion gain are updated, whereby the updated channel coefficient and the updated nonlinear distortion gain may be acquired.

Also, in the method for estimating a self-interference signal according to an embodiment of the present invention, the self-interference signal is estimated at step S540 using the final third-order nonlinear distortion, which is repeatedly re-estimated as many times as a preset number of iterations.

That is, the updated channel coefficient and the updated nonlinear distortion gain, acquired using Equation (13) and Equation (14), are used as the initial channel coefficient and the initial nonlinear distortion gain, whereby the third-order nonlinear distortion may be repeatedly re-estimated.

Here, the updated reception signal, which is used to repeatedly re-estimate the third-order nonlinear distortion, may be calculated as shown in Equation (15):

$$\hat{r}_n = r_n - \tilde{\alpha}_3 x_n^3 \cdot \tilde{h} \quad (15)$$

Here, unlike the method of calculating the updated reception signal in Equation (12), the updated third-order nonlinear distortion, which is acquired using the updated channel coefficient $\tilde{h}$ and the updated nonlinear distortion gain $\tilde{\alpha}_3$, may be eliminated in Equation (15). Accordingly, using the reception signal updated as shown in Equation (15), iterative estimation may be performed.

Here, iterative estimation may be performed until the performance required for the system is acquired, or as many times as the preset number of iterations.

Here, the final third-order nonlinear distortion is detected based on the updated channel coefficient and the updated nonlinear distortion gain, which are repeatedly re-estimated as many times as the preset number of iterations, and the self-interference signal may be estimated in consideration of the final third-order nonlinear distortion.

Also, although not illustrated in FIG. 5, in the method for estimating a self-interference signal according to an embodiment of the present invention, various kinds of information generated during the above-described process of estimating a self-interference signal may be stored in a separate storage module.

Through the above-described method for estimating a self-interference signal, a method for effectively estimating and eliminating a self-interference signal in a full-duplex environment may be provided.

Also, a method for more effectively estimating third-order nonlinear distortion, which distorts a self-interference signal, may be provided.

Figure 6:
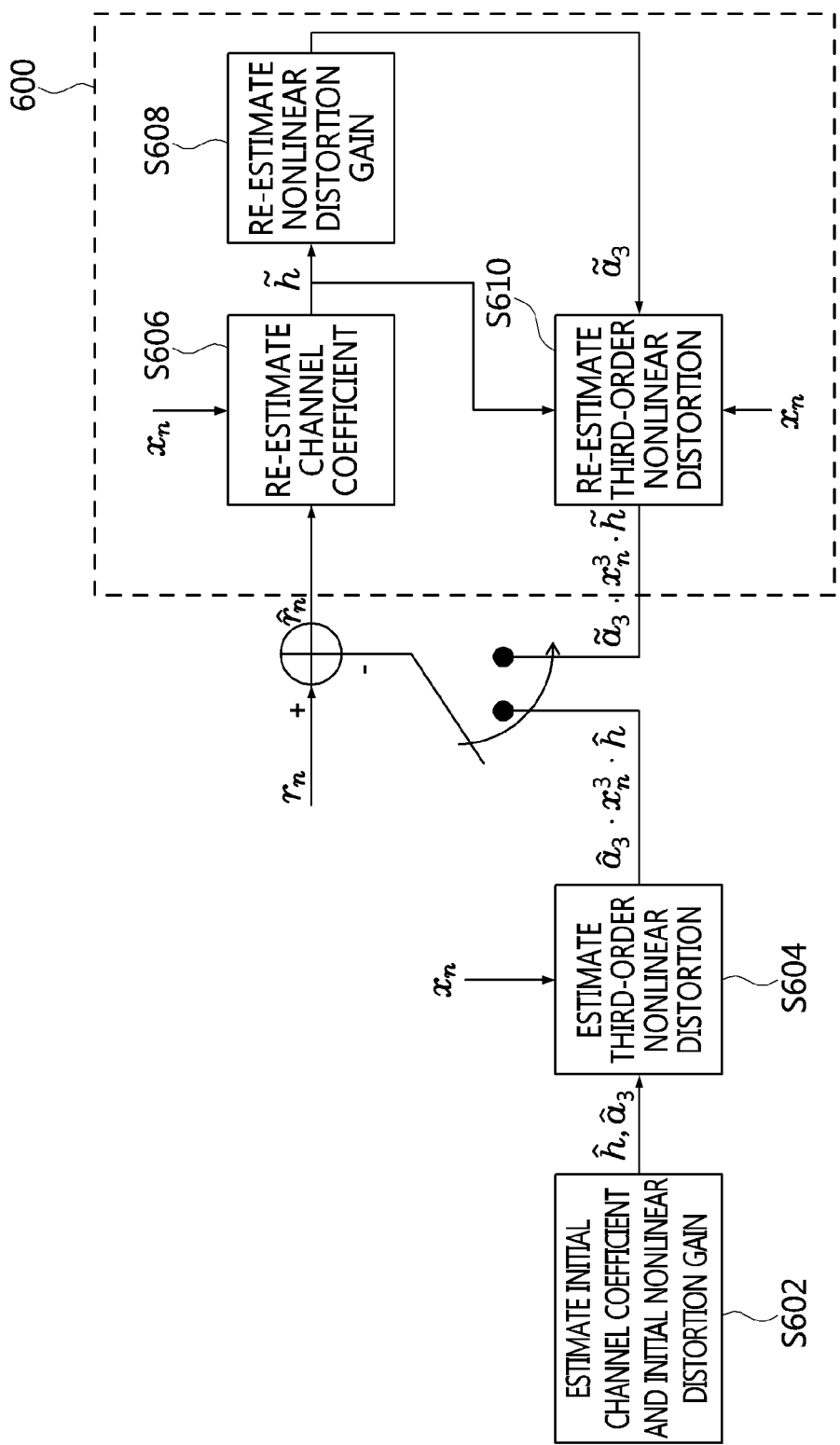
FIG. 6 is a view that shows the process of estimating a self-interference signal according to an embodiment of the present invention.

FIG. 6 is a view that shows the process of estimating a self-interference signal according to an embodiment of the present invention.

FIG. 6 shows the process of estimating a third-order nonlinear distortion based on an iterative method in the process of estimating a self-interference signal according to an embodiment of the present invention.

First, an initial channel coefficient and initial nonlinear distortion gain may be estimated at step S602 based on Equations (8) to (11), described with reference to FIG. 5.

Then, third-order nonlinear distortion ($\hat{\alpha}_3 \cdot x^3 \cdot \hat{h}$), which distorts a self-interference signal, may be estimated at step S604 using the estimated initial channel coefficient $\hat{h}$, the estimated initial nonlinear distortion gain $\hat{\alpha}_3$, and a transmission signal $x_n$, which is known.

Then, the third-order nonlinear distortion is eliminated from the reception signal $r_n$, whereby the updated reception signal $\hat{r}_n$ for iterative estimation may be calculated, as shown in Equation (12).

Then, the channel coefficient may be re-estimated at step S606, as shown in Equation (13), using the known transmission signal $x_n$ and the updated reception signal $\hat{r}_n$.

Then, based on the re-estimated channel coefficient $\tilde{h}$, the nonlinear distortion gain may be re-estimated at step S608, as shown in Equation (14).

Then, using the re-estimated channel coefficient $\tilde{h}$, the re-estimated nonlinear distortion gain $\tilde{\alpha}_3$, and the known transmission signal $x_n$, the third-order nonlinear distortion ($\tilde{\alpha}_3 \cdot x_n^3 \cdot \tilde{h}$) may be re-estimated at step S610.

Here, the third-order nonlinear distortion is repeatedly re-estimated by repeating the steps included in the iterative block 600 as many times as the preset number of iterations, whereby the present invention may more accurately estimate a self-interference signal.

Figure 7:
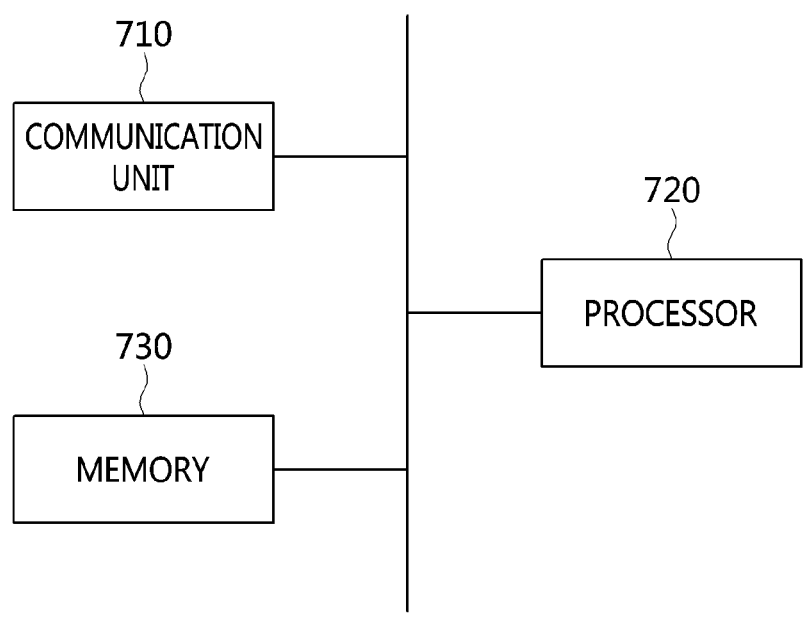
FIG. 7 is a block diagram that shows an apparatus for estimating a self-interference signal according to an embodiment of the present invention.

FIG. 7 is a block diagram that shows an apparatus for estimating a self-interference signal according to an embodiment of the present invention.

Referring to FIG. 7, the apparatus for estimating a self-interference signal according to an embodiment of the present invention includes a communication unit 710, a processor 720, and memory 730.

The communication unit 710 functions to transmit and receive information that is necessary in order to estimate a self-interference signal. Particularly, the communication unit 710 according to an embodiment of the present invention transmits two preamble signals from a transmission antenna to a reception antenna.

For example, two preamble signals may be generated using the signal generation and modulation module of the terminal 410 illustrated in FIG. 4, and the two preamble signals may be transmitted to the reception antenna via the High-Power Amplifier (HPA) 411, the transmission antenna, and the channel 420. Here, assuming that the two preamble signals generated in the terminal 410, that is, two transmission signals, are $x_1$ and $x_2$, two reception signals $r_1$ and $r_2$, corresponding to the two transmission signals, may be represented as shown in Equation (7):

$$r_1 = x_1 * h_1 + \alpha_3 \cdot x_1^3 * h_1 + w_1,$$

$$r_2 = x_2 * h_2 + \alpha_3 \cdot x_2^3 * h_2 + w_2 \quad (7)$$

Here, $h_1$ and $h_2$ are the channel coefficients corresponding to the channel 420 between the transmission antenna and the reception antenna illustrated in FIG. 4, and $\alpha_3$ is nonlinear distortion gain by the HPA 411.

Here, the channel coefficients $h_1$ and $h_2$ may be the same as each other in a fixed communication environment or in a communication environment in which the terminal hardly moves.

Also, because the channel coefficients correspond to the channel between the transmission antenna and the reception antenna of the same terminal, a Line of Sight (LoS) may be secured, and most energy may be assigned to a main path.

Accordingly, in the present invention, the channel coefficients $h_1$ and $h_2$ are assumed to be channel coefficients for a channel having a single path, and may thus be represented as h.

Here, the channel coefficient h is applied to Equation (7), and a convolution operation (*) is changed to multiplication (·), whereby Equation (8) may be acquired.

$$r_1 = x_1 \cdot h + \alpha_3 \cdot x_1^3 \cdot h + w_1,$$

$$r_2 = x_2 \cdot h + \alpha_3 \cdot x_2^3 \cdot h + w_2 \quad (8)$$

Here, while the two preamble signals are being transmitted, signals, other than the two preamble signals, may not be received by the reception antenna. That is, a signal transmitted from a counterpart terminal or other terminals may become an obstacle to estimation of a self-interference signal. Accordingly, the present invention assumes a specific time interval for estimating a self-interference signal during which a terminal transmits and receives only its own signals, and a counterpart terminal and other terminals transmit no signal thereto.

The processor 720 estimates third-order nonlinear distortion that distorts a self-interference signal based on the transmission signal and the reception signal for each of the two preamble signals.

Here, the channel coefficient for the channel between the transmission antenna and the reception antenna is estimated, nonlinear distortion gain by the High-Power Amplifier (HPA), which amplifies the signal to be transmitted, is estimated based on the channel coefficient, and a nonlinear factor, the order of which corresponds to the third-order Intercept Point (IP3), in the signal that is input to the HPA may be estimated based on the channel coefficient and the nonlinear distortion gain.

Here, because the nonlinear factor corresponding to the IP3 has been described with reference to FIG. 4, a description thereof will be omitted.

For example, using the reception signal $r_1$ in Equation (8), the channel coefficient h may be changed to a variable for the nonlinear distortion gain $\alpha_3$, as shown in Equation (9) and Equation (10):

$$\frac{r_1}{x_1} = \tilde{r}_1 = h + \alpha_3 \cdot x_1^2 \cdot h + \frac{w_1}{x_1} \quad (9)$$

$$\hat{h} = \frac{\tilde{r}_1}{1 + \alpha_3 x_1^2} + \dot{w} \quad (10)$$

Here, the nonlinear distortion gain $\alpha_3$ is calculated by putting $\hat{h}$ into the equation for the reception signal $r_2$, and this may be represented as shown in the following Equation (11):

$$\hat{\alpha}_3 = \frac{\tilde{r}_2 - \tilde{r}_1}{\tilde{r}_1 x_2^2 - \tilde{r}_2 x_1^2} + \ddot{w} \quad (11)$$

Here, Equation (10) is applied to Equation (9), whereby the channel coefficient h may be estimated.

Then, the estimated nonlinear distortion gain $\alpha_3$ and the estimated channel coefficient h are put into Equation (8) or Equation (9), whereby the nonlinear factor $x^3$, the order of which corresponds to the IP3, in the signal that is input to the HPA may be estimated.

Here, a convolution or multiplication operation is performed for at least one of the channel coefficient, the nonlinear distortion gain, and the nonlinear factor, whereby the third-order nonlinear distortion may be estimated. For example, the estimated third-order nonlinear distortion may correspond to '$\alpha_3 \cdot x^3 \cdot h$' or '$\alpha_3 \cdot x^3 * h$'.

Also, the processor 720 updates the reception signal by eliminating the third-order nonlinear distortion therefrom, and re-estimates the third-order nonlinear distortion based on the updated reception signal.

Here, the third-order nonlinear distortion may be re-estimated based on the updated reception signal in order to more correctly estimate the third-order nonlinear distortion in consideration of noise generated in the process of estimating the channel coefficient or the nonlinear distortion gain.

For example, when the channel coefficient h and the nonlinear distortion gain $\alpha_3$, which are estimated using Equation (10) and Equation (11), are used, it may be possible to estimate and eliminate the self-interference signal. However, it is impossible to eliminate the noise 4, which is generated when the channel coefficient is estimated in Equation (10), and the noise W, which is generated when the nonlinear distortion gain is estimated in Equation (11).

Accordingly, in order to improve the performance of self-interference signal estimation despite the environment in which noise exists, the present invention may perform iterative estimation.

Here, the third-order nonlinear distortion is eliminated from the reception signal for the first preamble signal, among the two preamble signals, whereby the updated reception signal may be calculated.

Then, using the transmission signal for the first preamble signal and the updated reception signal, the channel coefficient and the nonlinear distortion gain may be re-estimated.

For example, referring to Equation (12), third-order nonlinear distortion is generated using the channel coefficient and the nonlinear distortion gain, which are estimated in Equation (9) and Equation (10), and the third-order nonlinear distortion is eliminated from the reception signal, whereby the updated reception signal may be calculated.

$$\hat{r}_n = r_n - \hat{\alpha}_3 \cdot x_n^3 \cdot \hat{h} \quad (12)$$
$$= x_n \cdot h + \ddot{w}_n$$

In Equation (12), $\ddot{w}_n$ may be a variable acquired by adding Additive White Gaussian Noise (AWGN) and an error value that is generated when the third-order nonlinear distortion is incompletely estimated and eliminated. Here, after the third-order nonlinear distortion is eliminated, as shown in Equation (12), the channel coefficient may be newly estimated as shown in Equation (13) using the transmission signal $x_n$, which is known.

$$\tilde{h} = \frac{\hat{r}_n}{x_n} \quad (13)$$

Then, using the newly estimated channel coefficient $\tilde{h}$, the nonlinear distortion gain may be re-estimated as shown in Equation (14):

$$\tilde{\alpha}_3 = \frac{r_n - \tilde{h} \cdot x_n}{\tilde{h} \cdot x_n^3} \quad (14)$$

Through the above-described process, the channel coefficient and the nonlinear distortion gain are updated, whereby the updated channel coefficient and the updated nonlinear distortion gain may be acquired.

Also, the processor 720 estimates a self-interference signal using the final third-order nonlinear distortion, which is acquired by repeatedly re-estimating the third-order nonlinear distortion as many times as a preset number of iterations.

That is, the updated channel coefficient and the updated nonlinear distortion gain, acquired using Equation (13) and Equation (14), are used as the initial channel coefficient and the initial nonlinear distortion gain, whereby the third-order nonlinear distortion may be repeatedly re-estimated.

Here, the updated reception signal, which is used to repeatedly re-estimate the third-order nonlinear distortion, may be calculated as shown in Equation (15):

$$r_n = r_n - \tilde{\alpha}_3 \cdot x_n^3 \cdot \tilde{h} \quad (15)$$

Here, unlike the method of calculating the updated reception signal in Equation (12), the updated third-order nonlinear distortion, which is acquired using the updated channel coefficient $\tilde{h}$ and the updated nonlinear distortion gain $\tilde{\alpha}_3$, may be eliminated in Equation (15). Accordingly, using the reception signal updated as shown in Equation (15), iterative estimation may be performed.

Here, iterative estimation may be performed until the performance required for the system is acquired, or as many times as the preset number of iterations.

Here, the final third-order nonlinear distortion is detected based on the updated channel coefficient and the updated nonlinear distortion gain, which are repeatedly re-estimated as many times as the preset number of iterations, and the self-interference signal may be estimated in consideration of the final third-order nonlinear distortion.

The memory 730 may store transmission signals, reception signals, and at least one of the intermediate third-order nonlinear distortion and the final third-order nonlinear distortion.

Also, the memory 730 may store various kinds of information that is generated in the above-described process of estimating a self-interference signal.

Using the above-described apparatus for estimating a self-interference signal, a method for effectively estimating and eliminating a self-interference signal in a full-duplex environment may be provided.

Also, a method for more effectively estimating third-order nonlinear distortion, which distorts a self-interference signal, may be provided.

According to the present invention, a method for effectively estimating and eliminating a self-interference signal in a full-duplex environment may be provided.

Also, the present invention may provide a method for more effectively estimating a distortion factor that distorts a self-interference signal.

As described above, the apparatus and method for estimating a self-interference signal based on iterative estimation according to the present invention are not limitedly applied to the configurations and operations of the above-described embodiments, but all or some of the embodiments may be selectively combined and configured, so that the embodiments may be modified in various ways.

What is claimed is:

1. A method for estimating a self-interference signal, comprising:
    transmitting two preamble signals from a transmission antenna of a terminal to a reception antenna of the terminal;
    estimating third-order nonlinear distortion, which distorts a self-interference signal, based on a transmission signal and a reception signal for the two preamble signals;
    updating the reception signal by eliminating the third-order nonlinear distortion from the reception signal;
    re-estimating the third-order nonlinear distortion based on the updated reception signal; and
    estimating the self-interference signal based on a final third-order nonlinear distortion, which is acquired by iteratively re-estimating the third-order nonlinear distortion,
    wherein the estimating of the third-order nonlinear distortion comprises
        estimating a channel coefficient for a channel between the transmission antenna and the reception antenna,
        estimating nonlinear distortion gain, generated by a High-Power Amplifier (HPA) for amplifying the transmission signal, based on the channel coefficient, and
        estimating a nonlinear factor, an order of which corresponds to a third-order Intercept Point (IP3), in a signal that is input to the HPA based on the channel coefficient and the nonlinear distortion gain.

2. The method of claim 1, wherein the estimating of the third-order nonlinear distortion further comprises performing a convolution or multiplication operation for any one or any combination of any two or more of the channel coefficient, the nonlinear distortion gain, and the nonlinear factor.

3. The method of claim 1, wherein the re-estimating of the third-order nonlinear distortion based on the update reception signal comprises:
    calculating the updated reception signal by eliminating the third-order nonlinear distortion from a first reception signal for a first preamble signal, among the two preamble signals; and
    re-estimating the channel coefficient and the nonlinear distortion gain using the updated reception signal and a first transmission signal for the first preamble signal.

4. The method of claim 3, wherein the estimating of the self-interference signal comprises detecting the final third-order nonlinear distortion based on an updated channel coefficient and updated nonlinear distortion gain, which are iteratively re-estimated, and estimating the self-interference signal based on the first reception signal, the first transmission signal, and the final third-order nonlinear distortion.

5. The method of claim 1, wherein channel coefficients respectively applied to reception signals for the two preamble signals are identical to each other.

6. The method of claim 1, wherein, during the transmission of the two preamble signals, other signals are not transmitted to the reception antenna.

7. An apparatus for estimating a self-interference signal, comprising:
    a processor configured to
        estimate third-order nonlinear distortion, which distorts a self-interference signal, based on a transmission signal and a reception signal for two preamble signals that are transmitted from a transmission antenna of a terminal to a reception antenna of the terminal,
        update the reception signal by eliminating the third-order nonlinear distortion from the reception signal,
        re-estimate the third-order nonlinear distortion based on the updated reception signal, and
        estimate the self-interference signal based on a final third-order nonlinear distortion, which is acquired by iteratively re-estimating the third-order nonlinear distortion; and
    a memory configured to store the transmission signal, the reception signal, and either one or both of the third-order nonlinear distortion and the final third-order nonlinear distortion,
    wherein the processor is further configured to estimate a channel coefficient for a channel between the transmission antenna and the reception antenna, estimate nonlinear distortion gain, generated by a High-Power Amplifier (HPA) for amplifying the transmission signal, based on the channel coefficient, and estimate a nonlinear factor, an order of which corresponds to a third-order Intercept Point (IP3), in a signal that is input to the HPA based on the channel coefficient and the nonlinear distortion gain.

8. The apparatus of claim 7, wherein the processor is further configured to perform a convolution or multiplication operation for any one or any combination of any two or more of the channel coefficient, the nonlinear distortion gain, and the nonlinear factor.

9. The apparatus of claim 7, wherein the processor is further configured to calculate the updated reception signal by eliminating the third-order nonlinear distortion from a first reception signal for a first preamble signal, among the two preamble signals, and re-estimate the channel coefficient and the nonlinear distortion gain using the updated reception signal and a first transmission signal for the first preamble signal.

10. The apparatus of claim 8, wherein the processor is further configured to detect the final third-order nonlinear distortion based on an updated channel coefficient and updated nonlinear distortion gain, which are iteratively re-estimated, and estimate the self-interference signal based on the first reception signal, the first transmission signal, and the final third-order nonlinear distortion.

11. The apparatus of claim 7, wherein channel coefficients respectively applied to reception signals for the two preamble signals are identical to each other.

12. The apparatus of claim 7, wherein, during transmission of the two preamble signals, other signals are not transmitted to the reception antenna.

\* \* \* \* \*